Jan. 4, 1966  R. M. MILNES  3,228,027
PITCH AND ROLL CORRECTOR FOR USE IN A DOPPLER
RADAR NAVIGATION SYSTEM
Filed Nov. 2, 1961  10 Sheets-Sheet 1

| DRIFT | NO DRIFT |
|---|---|
| $f_{FL} = +4kc$ | $f_{FL} = +5kc$ |
| $f_{FR} = +6kc$ | $f_{FR} = +5kc$ |
| $f_{BR} = -4kc$ | $f_{BR} = -5kc$ |
| $f_{BL} = -6kc$ | $f_{BL} = -5kc$ |

ROBERT M. MILNES
INVENTOR.

BY
Killman, Smith & Lamb
ATTORNEYS

INVENTOR.
ROBERT M. MILNES

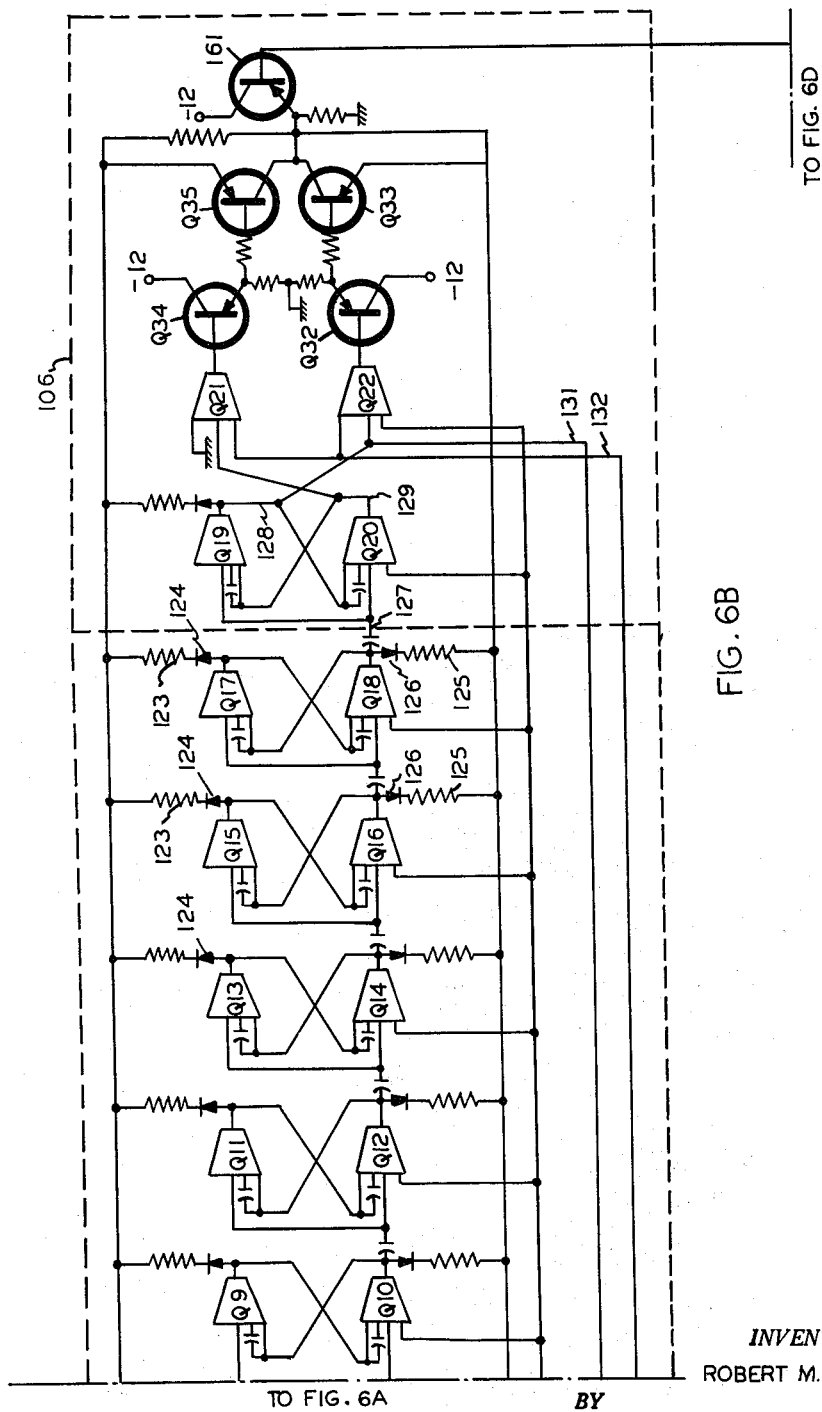

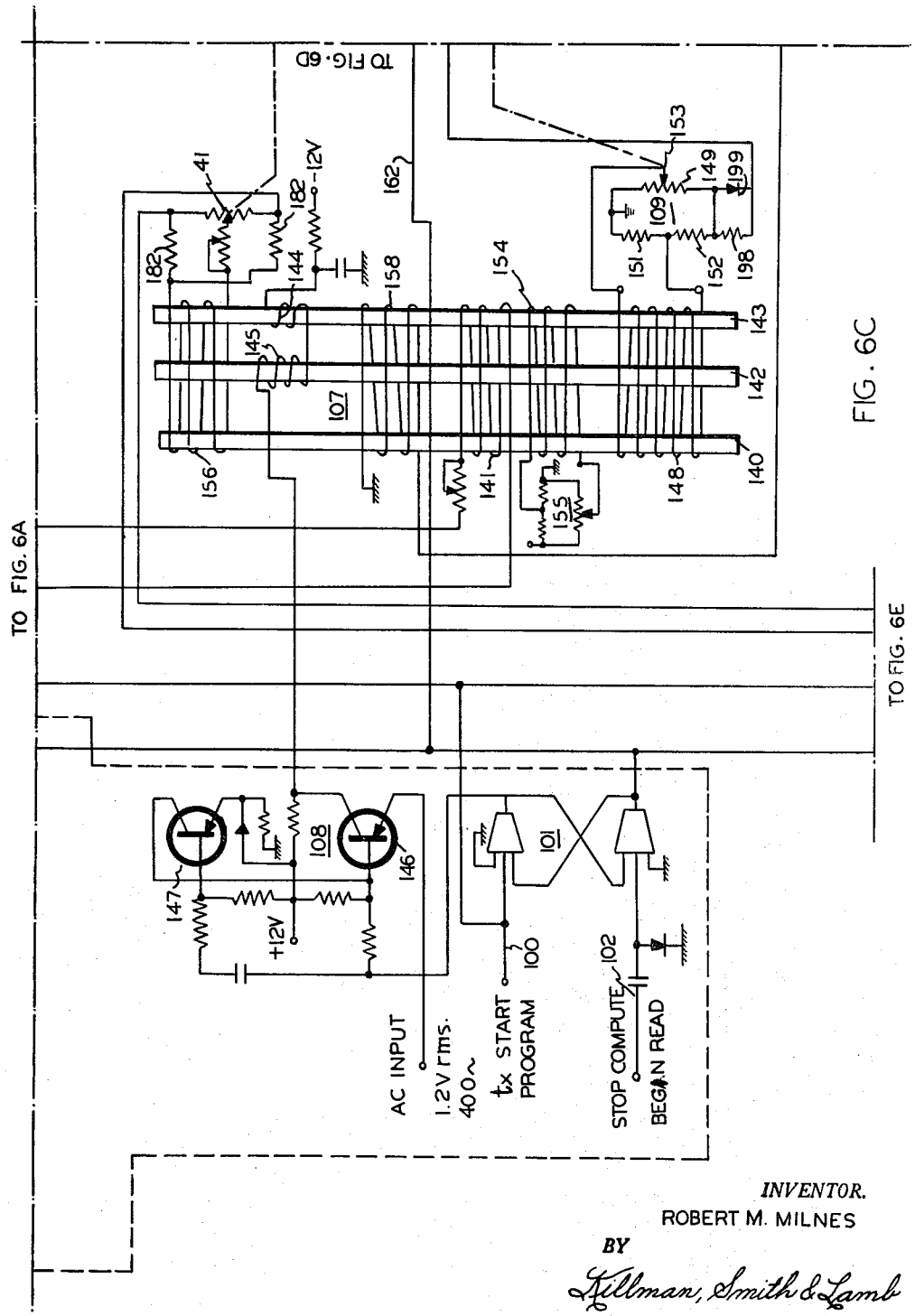

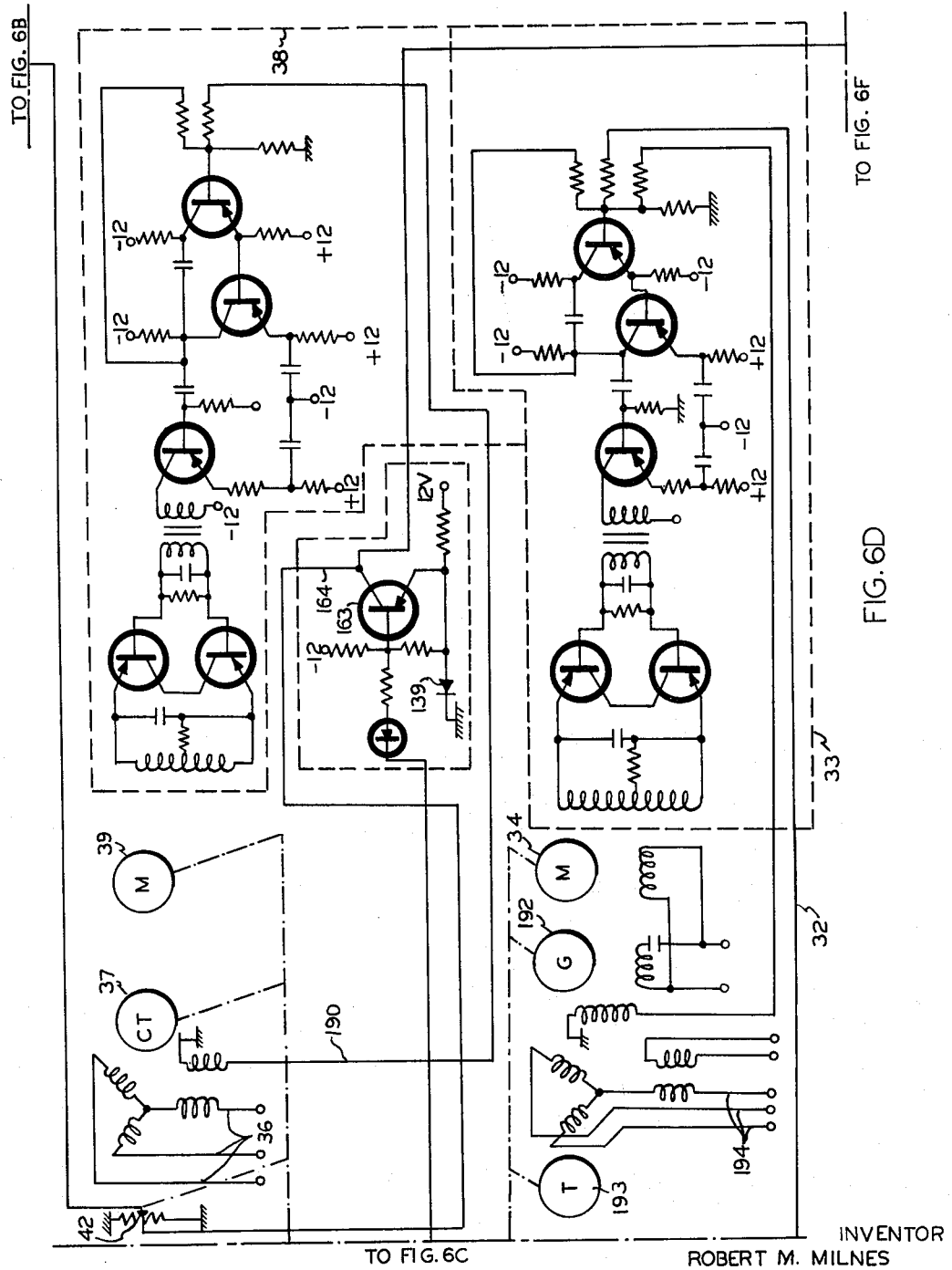

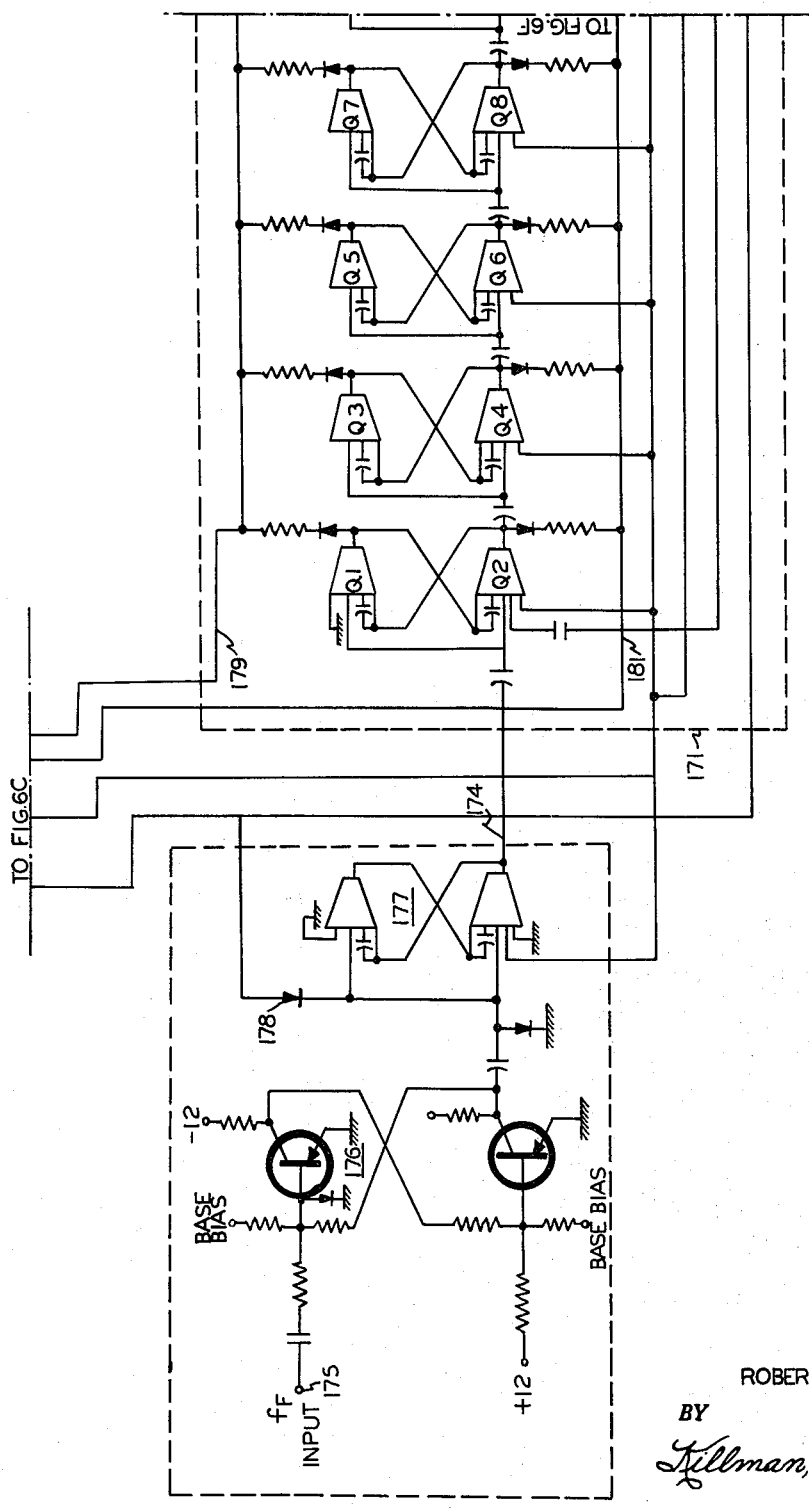

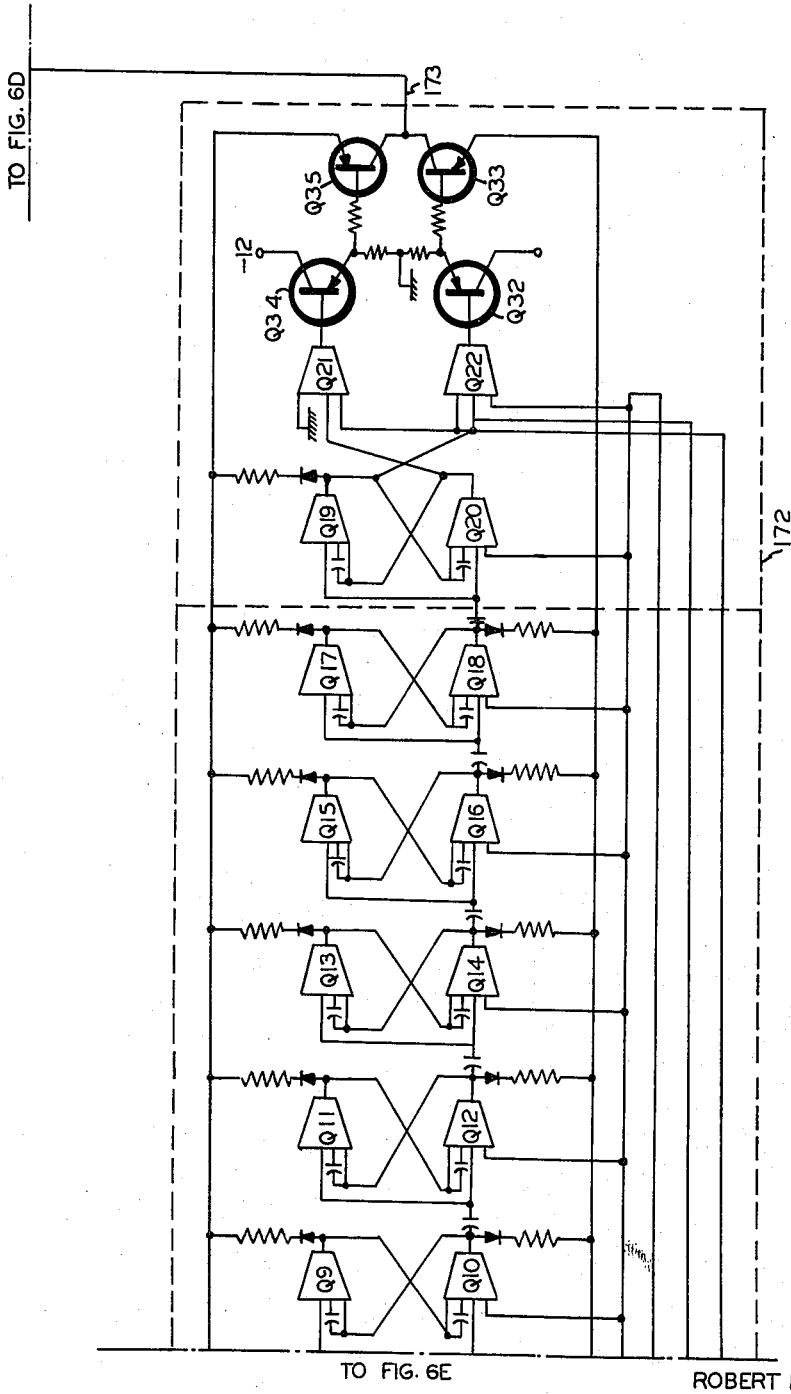

United States Patent Office 3,228,027
Patented Jan. 4, 1966

3,228,027
PITCH AND ROLL CORRECTOR FOR USE IN A DOPPLER RADAR NAVIGATION SYSTEM
Robert M. Milnes, Largo, Fla., assignor to The Bendix Corporation, a corporation of Delaware
Filed Nov. 2, 1961, Ser. No. 149,742
12 Claims. (Cl. 343—7)

This invention relates generally to Doppler navigation systems and more particularly to such systems which provide improved accuracy in the presence of pitch and roll maneuvers of the aircraft in which the system is installed.

Doppler navigation systems which have been heretofore provided are divided into two general classes depending upon the type of antenna utilized to secure in the aircraft the Doppler frequency shift information from ultra-high frequency or microwave radio beams reflected from the earth. These two classes are generally designated as: (1) the stabilized antenna Doppler systems; and (2) stabilized data Doppler systems. In the stabilized antenna system, the antenna which is used to radiate energy to the earth and receive reflected waves from the earth is mounted on a movable platform carried on the aircraft and suitable arrangements are made for maintaining the antenna oriented in a particular relation relative to the earth coordinates when Doppler information is to be obtained. For example, many of these arrangements employ servo systems for orienting the beams of the antenna along the ground track of the aircraft. These antennas are also stabilized for pitch and roll so that the attitude of the aircraft does not enter into the accumulation of data from the microwave beams.

Recently a relatively new Doppler navigation system employing stabilized data has come into wide-spread use. This stabilized data system utilizes a plurality of beams radiated downwardly from an aircraft with one beam symmetrically disposed in the four quadrants defined by the aircraft's coordinate axes. The data derived from such an antenna beam system must be stabilized for the attitude of the aircraft. In this context the word stabilized refers to mathematical manipulations of the data derived from the antenna beams to obtain the desired quantities, ground speed and drift angle, for the navigation computation so that the result is accurate even though the aircraft attitude or drift may be such as to dispose the beams in a completely asymmetrical manner relative to the ground coordinates of the aircraft.

A particular form of stabilized data Doppler system of the stabilized data type is disclosed and claimed in the co-pending application of Gunkel et al., Serial No. 845,034, filed October 7, 1959, and assigned to the assignee of the present application. The quantity computed by the system of this co-pending application is the true velocity of the aircraft which for a typical commercial airline flight profile introduces no significant error as a result of the failure to take into account the presence of the vertical velocity component. For certain high performance aircraft the climb angle may be such that the vertical velocity component is a significant portion of the total aircraft velocity and hence introduce error in the ground speed computation where such computation is based on a measurement of true aircraft velocity. This error will be particularly pronounced in high-altitude flights where descent from and climb to altitude en route is contemplated.

It is accordingly one of the principal objects of the present invention to provide an improved stabilized data Doppler navigation system in which a correction is introduced which approximates the climb angle of the aircraft for more accurately accounting for the vertical velocity component of the aircraft in the ground speed computation.

Inasmuch as the angle of climb of the aircraft cannot be readily measured, it is a feature of the present invention to provide a system which approximates the foregoing object by utilizing the angle of pitch as an approximation to the climb angle within a specified range which improves the accuracy of the system. Since many aircraft fly with a small positive angle of attack, the system in accordance with the invention introduces no correction for angles of pitch below a certain predetermined minimum value. For large values of the angle of pitch the aircraft will be approaching the stall condition and the angle of climb will depart considerably from the angle of pitch and hence the system in accordance with the present invention does not introduce any additional correction for pitch angles greater than a certain predetermined maximum value. Within the intermediate range between the predetermined minimum and maximum values of pitch, the present invention compensates the ground speed computation by the factor of the cosine of the angle of pitch to provide a computed ground speed value of improved accuracy for all flight profiles.

In the referenced Gunkel et al. application, the drift angle is derived by the solution of an equation which employs the velocity components in the aircraft coordinate systems which are along the aircraft longitudinal axis and transverse thereto with a correction term included which is different from zero only when pitch and roll occur simultaneously. This equation is based on the assumption that the vertical velocity component of the aircraft is small and exists for a relatively short time during the flight of the aircraft and hence provides accurate results only for flight profiles of commercial aircraft and the like. Where a significant vertical velocity component exists, it has been found necessary to re-examine the equation for drift angle by employing a rigorous conversion from the ground coordinate system to the aircraft coordinate system and instrumenting an approximation to this exact formula which includes a term directly proportional to the aircraft vertical velocity (i.e. normal to the aircraft longitudinal and transverse axes) and a modifier for each term related to the angle of roll. If this new approximation to the drift angle is solved, as provided by the present invention, a highly accurate result will be obtained over wide ranges of the angles of pitch, roll, climb and drift so that the system provides extremely accurate results for almost any flight profile conceivable for a forward flying aircraft.

It is accordingly another object of the invention to provide means for obtaining an improved drift angle solution which is based on approximations which do not introduce error which becomes significant within the normal range of operation of most aircraft.

It is a feature of the present invention to compute the terms of the equation for drift angle by an extension of the digital computor of the referenced Gunkel application with each term modified by a trigonometric function of the angle of roll.

These and other objects of the invention will be apparent from the following detailed description taken in conjunction with the accompanying drawings wherein.

Figure 1:
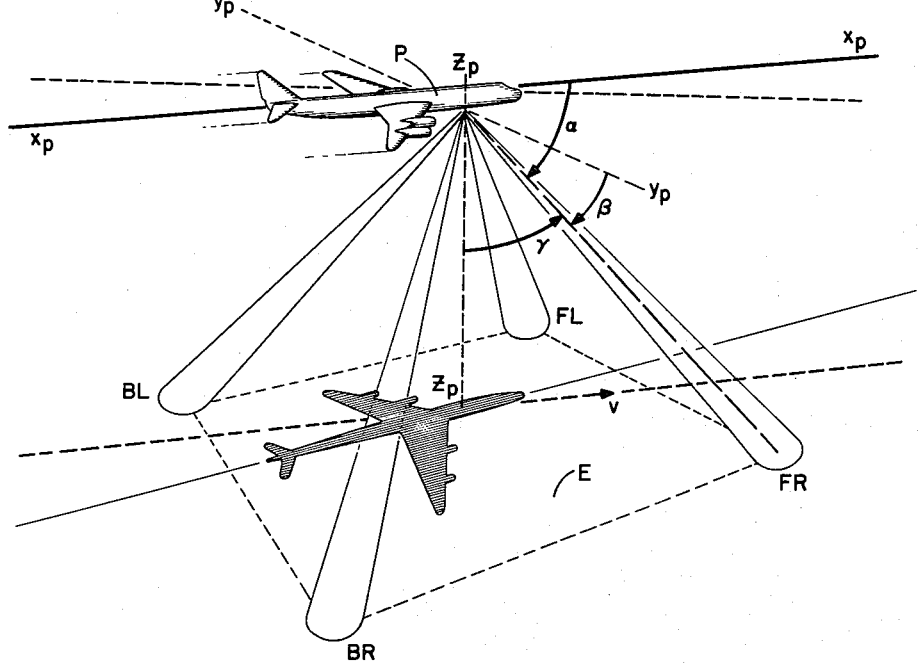
FIG. 1 is a perspective diagram of an aircraft in flight illustrating the geometry of the navigating problem.

The present invention is an improvement upon the navigation system disclosed in the patent application of Gunkel et al., referenced above. The navigation system of Gunkel et al. operates with respect to a geometrical configuration as shown in FIG. 1, in which an aircraft P is flying relative to the surface of the earth E. The plane's own coordinates are labeled $x_p-x_p$ coinciding with the longitudinal axis of the plane P, a vertical axis $z_p-z_p$ and a horizontal axis $y_p-y_p$ perpendicular to the $x_p$ axis. This set of coordinates has at its origin the antenna 30 which radiates the four pencil-shaped beams designated FL, FR, BR and BL. Each of these beams is positioned relative to the plane's coordinate system by angles $\alpha$, $\beta$ and $\gamma$ where $\alpha$ is the angle between the $x$ axis and the axis of the beam, $\beta$ is the angle between the $y$ axis and the axis of the beam, and $\gamma$ is the angle between the $z$ axis and the axis of the beam. In FIG. 1 these angles for the front-right beam FR are shown. The front-left (FL) and front-right (FR) beams are positioned symmetrically with respect to the vertical plane through the $x$ axis of the aircraft and thus lie on a constant Doppler hyperbola. The back-left (BL) and back-right (BR) beams are symmetrically positioned and thus also lie on a constant Doppler hyperbola. The front beams are inclined forward by the same angle that the back beams are inclined rearward. In accordance with the well known equation for the Doppler frequency shift due to forward motion and since the front and side angular displacement for each beam is the same the returned energy from the front beams will be increased in frequency by the same amount that the energy returned to the back beams is decreased in frequency.

Figure 2:
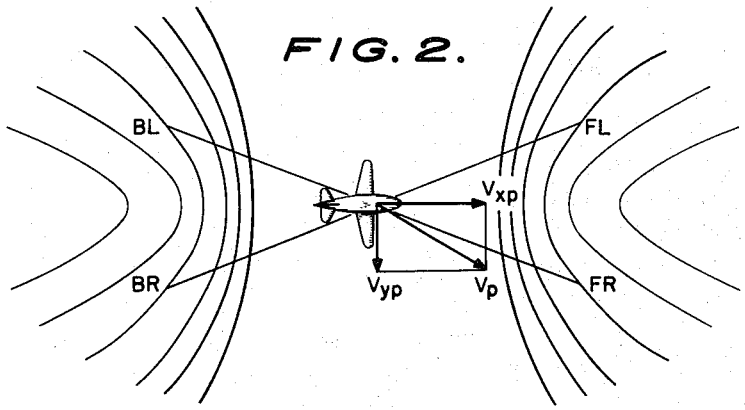
FIG. 2 is a plan view of the aircraft relative to the field of constant Doppler hyperbolas.

Constant Doppler hyperbolas are shown in FIG. 2, which is a plan view of the aircraft in FIG. 1. The aircraft is traveling at a velocity $V_p$ which has a velocity component $V_{XP}$ along the $x$ axis and a velocity $V_{YP}$ along the $y$ axis. If $V_{YP}$ were zero (i.e. no drift) the Doppler shifts experienced by all four beams would be equal, the front beams being increased in frequency by, say, 5 kilocycles and the back beams being decreased by 5 kc. Where drift exists the component $V_{YP}$, if to the right, for example, produces a resultant decrease in velocity of the beam FL, hence $f_{FL}$ equals, say, plus 4 kc. while the $y$ component of velocity as shown in FIG. 2 produces an increase in velocity for the beam FR. Thus the corresponding frequency $f_{FR}$ would equal 6 kc. With respect to the back beams the situation is just reversed. The $V_{YP}$ velocity component in effect decreases the speed of recession of the beam BR and $f_{BR}$ decreases to a Doppler shift of 4 kc. while $f_{BL}$ increases to 6 kc. shift. It is to be understood, of course, in FIG. 2 that the signs of the frequency shifts are to indicate the direction of shift from the transmitted frequency and that the quantities represented are not negative numbers. For the configuration of four beams shown in FIG. 2 the sum of all the frequencies for a given $V_{XP}$ will remain constant irrespective of drift velocity $V_{YP}$. This same consideration can be stated for conditions involving pitch and roll since rotational movement of the aircraft about its longitudinal or transverse axes merely shifts the beams with respect to the families of hyperbolas of constant Doppler shift indicated in FIG. 2 such that the sum of the shifts remains constant. Accordingly, a frequency which is proportional to the sum of the Doppler frequencies from all four beams is a frequency which is directly related to $V_{XP}$, the velocity of the aircraft along its own axis.

Figure 3:
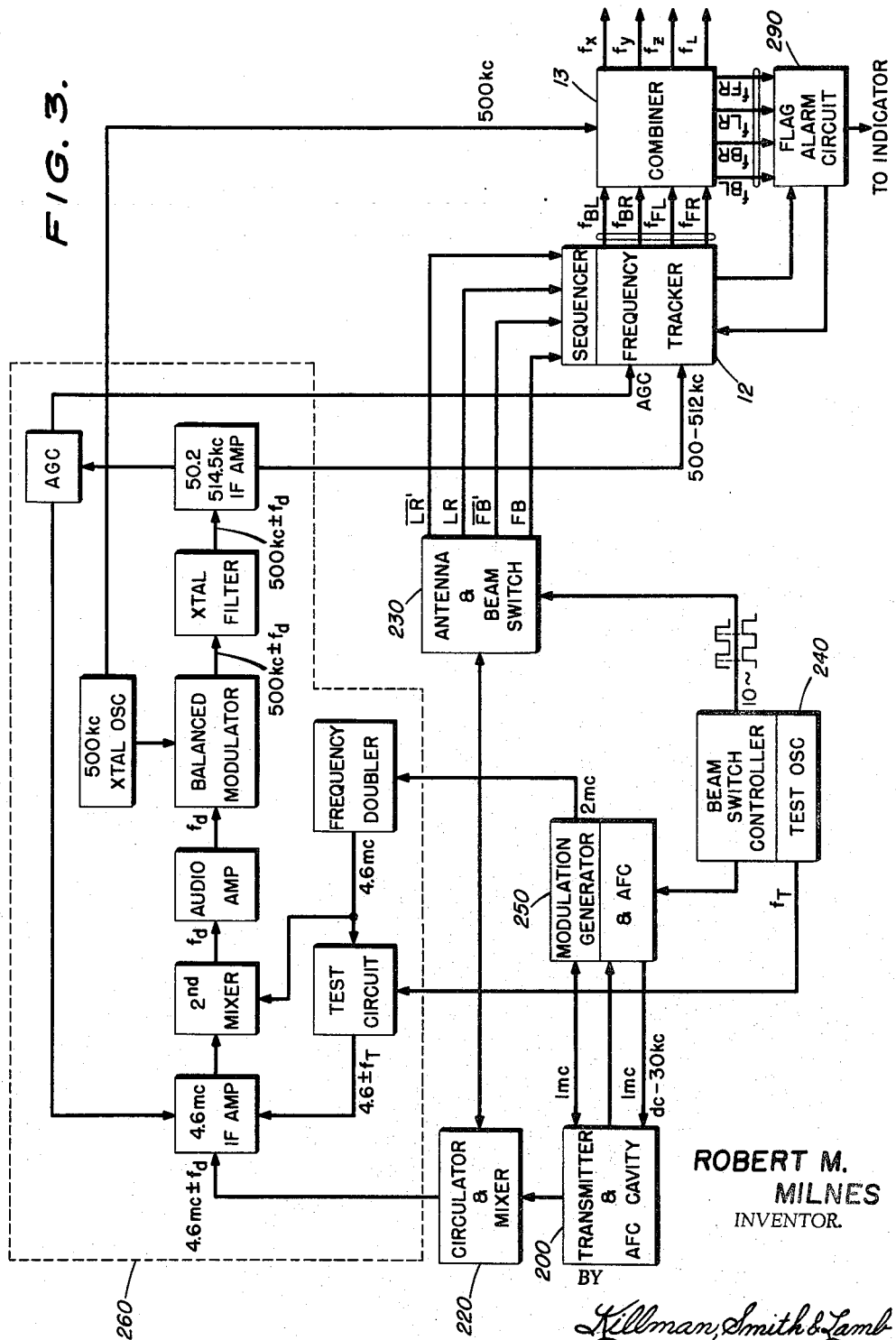
FIG. 3 is a block diagram of the data acquisition portion of a four beam Doppler radar system with which the present invention may be advantageously combined.

The block diagram of major elements of the system of Gunkel et al. is shown in FIG. 3. The system operates at a microwave frequency generated by a transmitter 200 which supplies a C.W. frequency of 8,800 megacycles frequency modulated at approximately 1.1 mc. in a predetermined fashion. This frequency modulated C.W. signal is applied from the transmitter 200 to a circulator and mixer device 220 which channels the energy from the transmitter 200 to an antenna 230 and channels received energy from the antenna 230 to a mixer which operates with respect to the transmitter frequency to produce an FM spectrum including a double side band signal of the fourth harmonic of the modulation frequency, plus and minus the Doppler frequency.

The antenna 230 is a planar array of slot radiators which are fed from suitable wave guide paths which include controllable ferrite switches for the purpose of directing the beam from the antenna 230 in any one of four distinct directions. The ferrite switches for controlling the beam direction of the antenna 230 are sequentially energized from a beam switch controller 240 which generates a basic 10 pulse per second timing wave for rotating the beams from the antenna 230 through the four positions sequentially and for controlling other portions of the system in synchronism with the beam switching.

The transmitter 200 is frequency modulated by a modulation generator 250 and the center frequency of the C.W. carrier is maintained by an AFC loop to hold antenna beam angles constant while permitting FM.

The fourth harmonic of approximately 4.6 megacycles from the first mixer 220 is applied as an input to a receiver 260 which produces a single side band output signal on a 500 kc. sub-carrier, sequentially modulated with the Doppler frequency spectra from the four antenna beams.

The signal output from the receiver 260 is applied to a frequency tracker 12 with the signal fed in sequence to each of four trackers associated with the four antenna beams. The four frequency trackers each have an oscillator which is voltage controlled to be servoed to match the center of the Doppler spectra in the respective beams. Although the input to these trackers is the time shared signal spectra from the receiver, the tracking oscillators operate continuously to provide four frequencies associated with the four antenna beams, precisely equal to the frequency centers of the respective Doppler spectra. These four frequencies are designated $f_{BL}$, $f_{BR}$, $f_{FL}$ and $f_{FR}$ corresponding to the beam position from which they originate and are continuously available for use by the computer circuits which follow. These four frequencies are applied to a combiner 13 which combines algebraically the input frequencies in various sum and difference combinations to generate three output frequencies which represent the three coordinates of velocity of the aircraft in which the system of the invention is installed. A fourth combination of the input frequencies to the combiner 13 provides a known resultant when the system is operating correctly and hence can be utilized by a flag alarm circuit 290 to indicate malfunctioning of the equipment. The output frequencies of the combiner 13 designated $f_x$, $f_y$ and $f_z$, contain all of the information necessary to compute the magnitude of ground velocity or ground speed.

Figure 4:
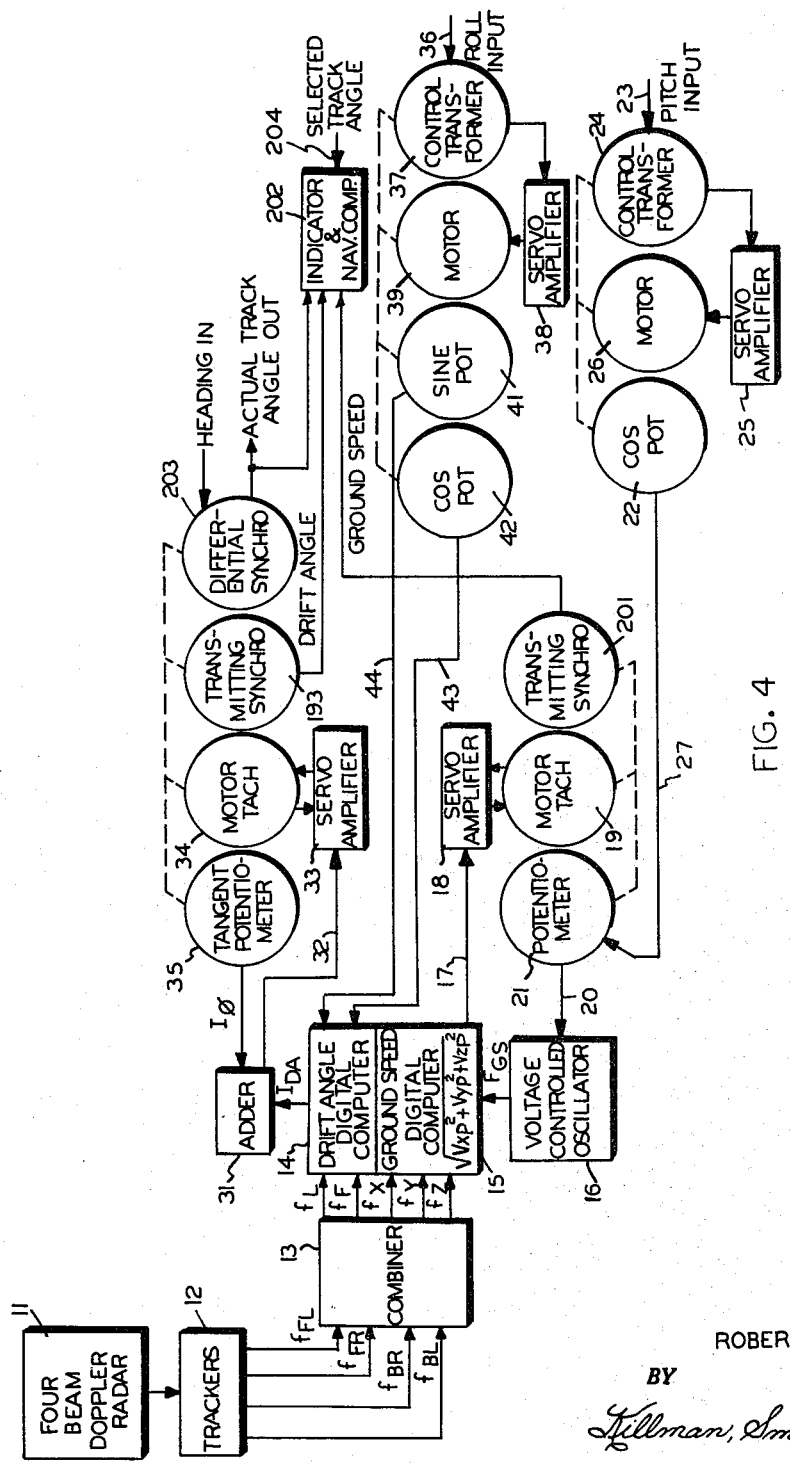
FIG. 4 is a block diagram of a Doppler radar navigation system improved in accordance with the invention.

Referring now to FIG. 4, the system of the invention is disclosed in relation to a four beam Doppler radar 11, which includes the transmitter 200, circulator and mixer 220, antenna and beam switch 230, beam switch controller 240, modulation generator 250 and receiver 260 of FIG. 3. The Doppler radar 11 recovers from each of the four transmitted beams the Doppler frequency shift signal which is applied to the trackers 12 for generating four frequencies which are maintained at the center of the power spectrum of the returned frequency-shift signal received on each beam, respectively. The corresponding frequencies generated by the trackers 12 are indicated as $f_{FL}$, $f_{FR}$, $f_{BR}$ and $f_{BL}$ corresponding to the beam position from which the data is obtained for deriving the respective frequency in each tracker oscillator. The four frequencies from the trackers 12 are applied to a combiner 13 where the frequencies are manipulated algebraically to produce five output frequencies designated $f_L$, $f_F$, $f_x$, $f_y$ and $f_z$. The frequencies $f_x$, $f_y$ and $f_z$ are directly proportional to the velocity components of the aircraft in the aircraft's own coordinate system defined by the longitudinal axis of the aircraft and the transverse and normal axes through the aircraft. The frequency $f_L$ is equal to $f_{FL}+f_{BR}$, the sum of the diagonal pair of beams consisting of the front-left and back-right beams frequencies. The frequency $f_F$ is equal to the sum of the frequencies from the front two beams $f_{FL}+f_{FR}$. In the computations that follow it will be apparent that the other diagonal pair of beams could be used to obtain the left-right frequency equivalent to $f_L$ and the rear beams could be used to obtain the up-down frequency equivalent to $f_F$.

The system as thus far described corresponds with that disclosed in detail in the referenced Gunkel et al. application, the disclosure of which is incorporated by reference for the purpose of a detailed understanding of the system of the invention. In addition to the system there disclosed, an additional ring circuit for adding the frequencies to make up $f_F$ will be required since this frequency was not used in the system of the Gunkel et al. application. The operation of a ring circuit to add two frequencies and obtain a frequency equal to their sum will be apparent from the referenced disclosure. The frequencies supplied by the combiner 13 are applied to a drift angle digital computor 14 and a ground speed digital computor 15, which have been modified in accordance with the present invention to provide improved accuracy in the computed result.

The ground speed digital computor 15 accumulates the counts of $f_x$, $f_y$ and $f_z$ during programed intervals and a second register accumulates the summation of the series of counts. The total summation is compared with the count accumulated in a separate counter which counts the cycles of a ground speed oscillator 16. The comparison of these counts is used to generate an error signal which is applied on line 17 to the servo amplifier 18. The servo amplifier 18 drives a motor tachometer 19 which controls the voltage tapped from a potentiometer 21 to be applied to the oscillator 16 which is voltage controlled to vary in frequency. By means of this servo loop the frequency of the ground speed oscillator 16 is adjusted to apply a frequency to the ground speed computor 15 which produces a zero error signal on line 17. This condition prevails when the frequency generated by the oscillator 16 is exactly equal to a frequency proportional to the apparent ground speed of the aircraft which, in this computation, is considered to be the magnitude of the aircraft velocity vector. As previously noted this is a sufficiently accurate approximation only for small values of the vertical velocity component.

In accordance with the present invention, the voltage supply to the potentiometer 21 is derived from a cosine potentiometer 22, the output of which varies as the cosine of the angle of pitch. This output is achieved by a servo loop which has input pitch angle data on line 23 to a control transformer 24 which applies an electrical output to a servo amplifier 25. The amplifier 25 controls the drive for a motor 26 which is mechanically coupled with the control transformer 24 and the cosine potentiometer 22 thereby nulling the control transformer when the angular position of three units 22, 24 and 26 corresponds to the pitch angle. By this arrangement the angular position of the potentiometer 21 is directly related to the magnitude of the aircraft true velocity, $V_p$, times the cosine of the pitch angle which is equal to the ground speed. The actual voltage magnitude from potentiometer 21 remains proportional to true velocity and the frequency of the oscillator 16 is adjusted accordingly. A detailed description of the circuit for performing this correction in accordance with the cosine of the pitch angle will be set forth in connection with FIG. 5.

The remaining portion of FIG. 4 relates to the circuits for completing the drift angle computation in the computor 14. As described in the Gunkel et al. application the drift angle computor 14 contains a counter which compares the count of $f_L$, representing transverse velocity, with the count $f_x$, representing longitudinal velocity, to develop a current representing drift angle which is supplied to an adding device 31. The adder 31 is a magnetic amplifier which applies an error signal on line 32 to a servo amplifier 33 for operating a motor tachometer 34. The motor 34 drives a tangent potentiometer 35 to supply a nulling current to the adder 31 thereby producing a null when the motor 34 has driven the tangent potentiometer 35 to a position corresponding to the drift angle. This computation as previously made has been based upon the equation:

$$\tan \delta = \frac{V_{yp}}{V_{xp}} - \sin P \sin R$$

As previouly noted this equation is an approximation and the present invention computes drift angle by using a more accurate approximation derived as follows:

The true drift angle $\delta$ of an aircraft is:

$$\delta = \arctan \frac{V_y}{V_x}$$

where:

$V_y$ = the aircraft velocity component along the ground coordinate $y$ axis.
$V_x$ = the aircraft velocity component along the ground coordinate $x$ axis Since the present system employs an antenna that is rigidly affixed to the airframe, the Doppler information derived is no longer in terms of a ground coordinate system (as in the case of a stabilized antenna) but now in terms of the aircraft coordinte system.

The following relationships exist upon transforming from a ground coordinate system to the aircraft coordinate system:

$$V_y = V_{yp} \cos(r) - V_{zp} \sin(r)$$
$$V_x = V_{xp} \cos(p) + V_{yp} \sin(r) \sin(p) + V_{zp} \cos(r) \sin(p)$$

where:

$V_{yp}$ = the aircraft transverse velocity component along the aircraft coordinate $y$ axis
$V_{xp}$ = the aircraft longitudinal velocity component along the aircraft coordinate $x$ axis
$V_{zp}$ = the aircraft vertical velocity component along the aircraft $z$ axis
$r$ = the roll angle of the aircraft (a rotation around the aircraft coordinate $x$ axis)
$p$ = the pitch angle of the aircraft (a rotation around the ground coordinate $y$ axis)

Hence the drift angle of the aircraft in terms of aircraft coordinates:

$$\delta = \arctan \frac{V_{yp} \cos(r) - V_{zp} \sin(r)}{V_{xp} \cos(p) + V_{yp} \sin(r) \sin(p) + V_{zp} \cos(r) \sin(p)} \quad (1)$$

Equation 1 can be approximated with good accuracy for all normal values of pitch, roll and drift angle by the following equation:

$$\delta = \arctan \left[ \frac{V_{yp}}{V_{xp}} \cos(r) - \frac{V_{zp}}{V_{xp}} \sin(r) \right] \quad (2)$$

The corrections to the terms of Equation 2 which are provided in FIG. 1 are derived from a roll servo system in which roll input data is applied on line 36 to a control transformer 37 which applies an electrical signal to servo amplifier 38 to operate a motor 39. The motor 39 positions the control transformer 37 to produce a null output signal to amplifier 38 thereby closing the servo loop. The position of motor 39 determines the setting of a sine potentiometer 41 and a cosine potentiometer 42.

In the system of the present invention, the relations for computing the ratio quantities in Equation 2 from the beam data frequencies are derived as follows. The ratio $V_{yp}/V_{xp}$ is the same ratio computed in accordance with Equation 25 of the referenced Gunkel et al. application and has a magnitude equal to $(1-2f_L/f_x)$.

The ratio $V_{zp}/V_{xp}$ is equal to $f_z/f_x$ where:

$$f_z = f_F + f_B$$

and $$f_x = f_F + f_B$$

Subtracting the second equation from the first and transposing produces $$f_z = f_x - 2f_F$$

or $$f_z/f_x = 1 - 2f_F/f_x$$

In the above derivation the quantities $f_F$ and $f_B$ are defined as:

$$f_F = f_{FL} + f_{FR}$$

and $$f_B = f_{BL} + f_{BR}$$

The voltage output from the cosine potentiometer 42 is applied on line 43 to the drift angle computor 14 where it supplies the input to the drift angle ratio counter and hence modifies the drift angle current produced thereby in accordance with the cosine of the angle of roll and satisfies the first term of Equation 2. The digital drift angle computor 14 includes a second ratio counter for computing the ratio in the second term of Equation 2 $V_{zp}/V_{xp}$, and this ratio is modified in accordance with the sine of the roll angle as derived from the potentiometer 41 on line 44. By this arrangement the terms of Equation 2 are computed by being introduced into the drift angle current supplied from the computor 14 to the adder 31. True drift angle in accordance with Equation 2 is obtained when the tangent potentiometer is adjusted to an angular position corresponding to the drift angle and thus supplies a current term to the adder 31 which nulls the servo system controlling the tangent potentiometer 35. The detailed operation of the drift angle computor 14 and the associated correction circuits will be given in connection with FIG. 6.

Figure 5:
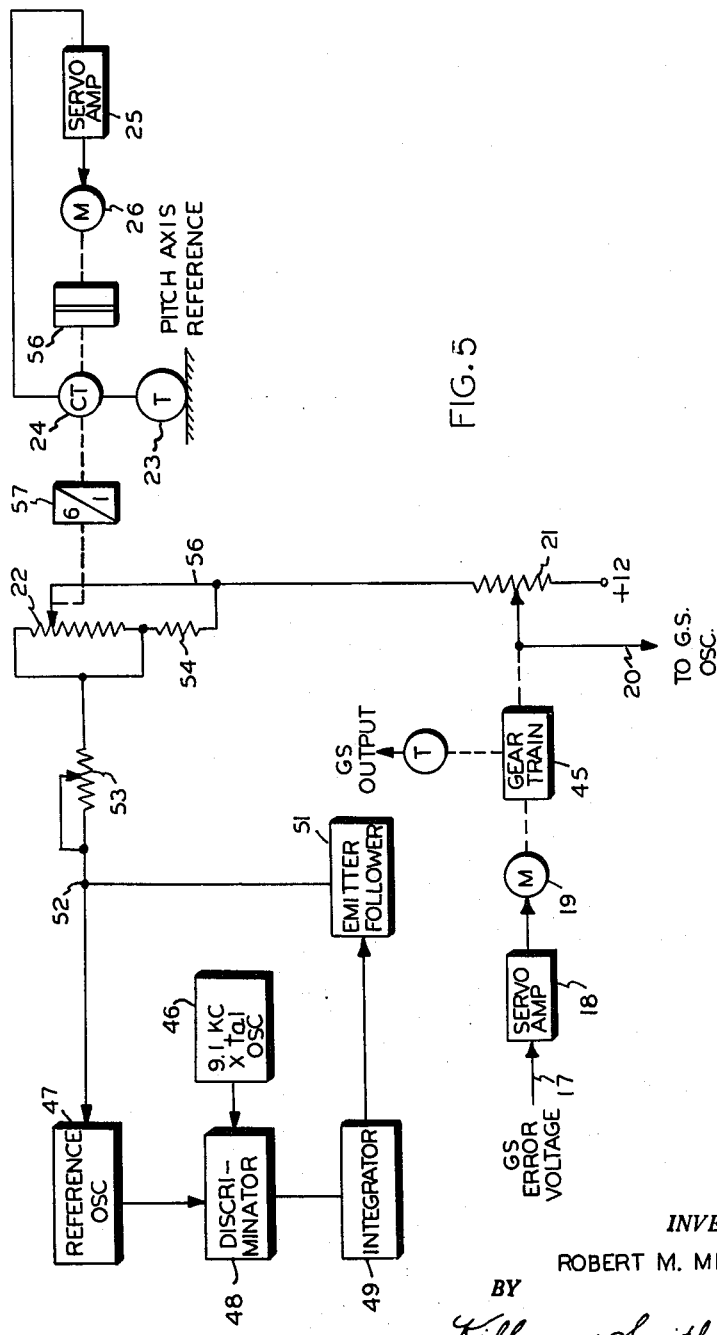
FIG. 5 is a block diagram partly schematic of a portion of the ground speed computor system modified to incorporate a correction for the angle of pitch.

Referring now to FIG. 5, a portion of the circuit shown in FIG. 10f of the co-pending Gunkel et al. application will be described as modified in accordance with the present invention. As previously set forth herein, a ground speed oscillator is controlled in accordance with the voltage on line 20 derived from a potentiometer 21 driven by a motor 19 in response to signals out of servo amplifier 18. The ground speed oscillator frequency is applied to the ground speed digital computor 15 to generate the error voltage for the servo amplifier 18 in accordance with the teaching of the Gunkel et al. application. As indicated in FIG. 5, a gear train 45 may be interposed between the motor 19 and the movable contact on potentiometer 21.

The voltage supply to the potentiometer 21 is derived from a temperature compensation servo loop comprising a crystal controlled oscillator 46 and a reference oscillator 47, the frequencies of which are compared in a discriminator 48 to produce a D.C. signal to an integrator 49. The integrator 49 supplies through an emitter follower 51 the voltage at point 52 which is used to supply the potentiometer 21. The same voltage is applied to the reference oscillator 47 which is maintained at the frequency of crystal oscillator 46. After the reference oscillator 47 is pulled into the frequency of oscillator 46 the voltage change at point 52 is in accordance with the requirements to maintain this frequency correspondence since the discriminator 48 is acting as a phase detector to maintain phase lock between the two oscillators 46 and 47. The voltage change at point 52, therefore, is sufficient to compensate for temperature changes in the ground speed oscillator 16 since the same temperature changes affect the oscillator 47. It will be noted that the crystal oscillator 46 operates at 9.1 kc. as compared to 8.0 kc. in the Gunkel et al. application. The change provides a somewhat larger voltage at point 52 to offset the voltage drop in potentiometer 22.

The voltage from point 52 is applied through a trimming adjustment resistor 53 and connected to both ends of the linear potentiometer 22. A fixed resistor 54 is also connected from the trimming resistor 53 to line 56 which is connected to the movable tap on potentiometer 22. With resistor 54 having a value of 445 ohms and potentiometer 22 having a linear winding of 1,000 ohms an approximation to the cosine function is obtained. This arrangement also provides negligible voltage change for positions of the movable tap on potentiometer 22 near the mid-point corresponding to pitch angles of $\pm 5°$.

The drive for the movable tap of the potentiometer 22 is obtained from the servo system operated from the pitch axis reference 23 which supplies an electrical pitch signal to the control transformer 24. The control transformer 24 applies an error signal to the servo amplifier 25 which drives the motor 26 which positions through a slip clutch 56 the control transformer 24. The slip clutch 56 is introduced with stops on the drive to the control tarnsformer 24 at predetermined angles at which the angle of pitch no longer is a fair approximation of the angle of climb. This angle will be in the neighborhood of 28.5° for example, so that for angles of pitch in excess of 28.5° the stops on the slip clutch 56 prevent the control transformer from being adjusted to such greater angles and a continuous error signal is applied to keep the motor 26 running. As soon as the pitch angle drops below the angle determined by the stops on the slip clutch 56 the error signal out of control transformer 24 will again be effective to position the motor and the control transformer 24 through slip clutch 56 at a position which produces a null error signal. A six to one gear ratio box 57 is introduced between the control transformer 24 and the movable tap on potentiometer 22 in order to drive the tap over a range of approximately 170° which utilizes the full winding of potentiometer 22.

The circuit of FIG. 5 is calibrated by setting the pitch angle reference 23 to zero degrees and adjusting the position of the tap on potentiometer 22 for a frequency minimum in the ground speed oscillator. The ground speed oscillator is then adjusted to generate 8.5 kc., corresponding to the maximum indicator speed, with the tap on potentiometer 21 set at the top end of the winding (i.e. at the same potential as the tap on potentiometer 22).

Figure 6A:
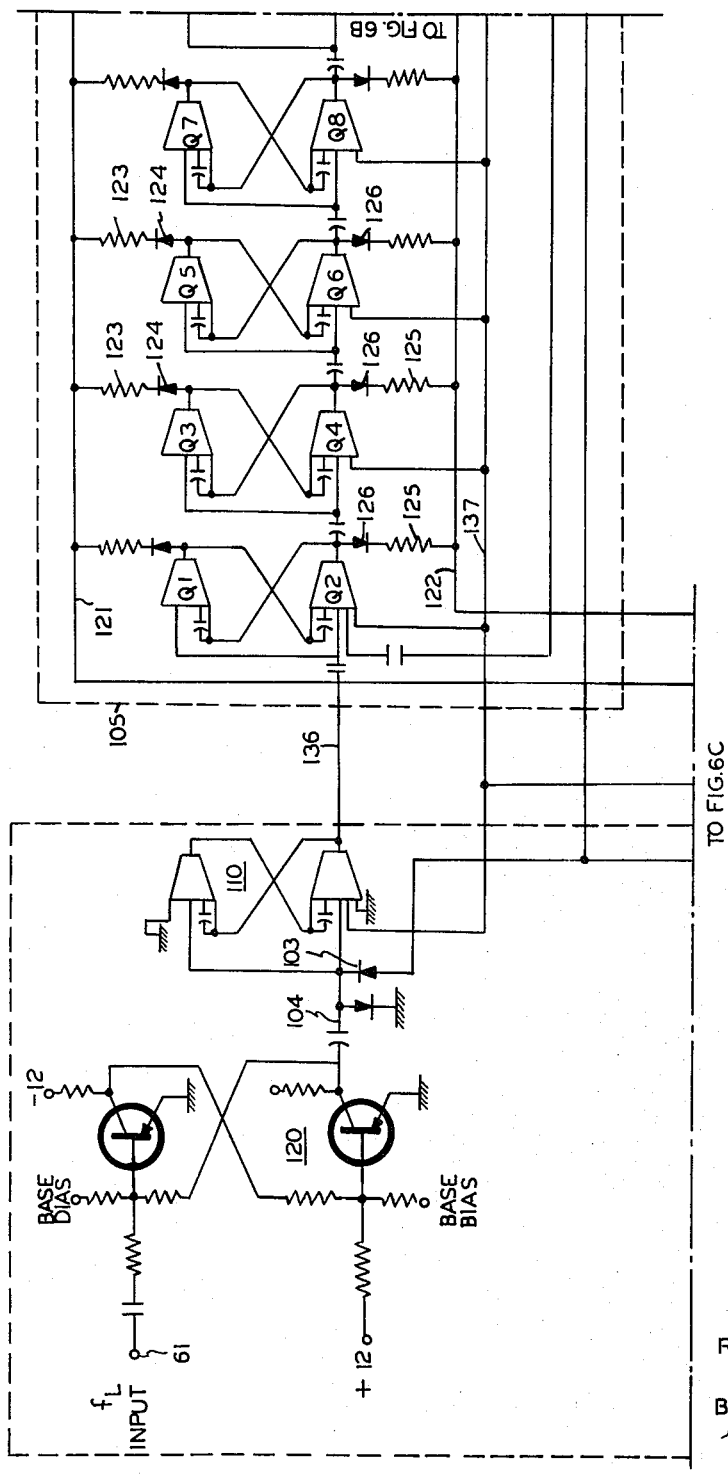
FIGS. 6A, B, C, D, E and F assembled as indicated are a schematic wiring diagram of a drift angle computor in accordance with the invention.

Referring now to FIG. 6 the schematic diagram of the drift angle computation system will be described. The drift angle computation ordinarily takes place during the $\phi_x$ phase of the ground speed programer as described in the co-pending Gunkel et al. application. For this purpose, a reset pulse $t_x$ which starts the $f_x$ count in the ground speed computation is also applied on line 100 to the drift angle programer flip-flop 101. This pulse starts the drift angle computation at the same instant the $f_x/8$ count starts in the ground speed register of the ground speed computor 15. The drift angle programer 101 receives a stop signal on line 102 from the ground speed register upon the occurrence of the 256th count of $f_x/8$ corresponding to the 2048th count of $f_x$. The programer 101 controls a diode gate 103 to which is applied the frequency $f_L$ on line 104 after being shaped in a hysteresis switch 120 to which the frequency $f_L$ is applied at the $f_L$ input terminal 61. The frequency $f_L$ is obtained from the combiner 13. The frequency $f_L$ is gated by gate 103 to a flip-flop 110 which divides the frequency by two and applies it to a weighted counter 105. The weighted counter 105 produces a current output which is proportional to the ratio of $$-\left(f_L - \frac{f_x}{2}\right)\bigg/\frac{f_x}{2}$$

by comparing the counts of $f_L$ and $f_x/2$ during the interval determined by the $f_x$ count. This current also passes through a current polarity switch 106 and is applied with selected polarity as one input to a summing magnetic amplifier 107. The magnetic amplifier 107 is the adder 31 of FIG. 4. The amplifier 107 is supplied with 400 cycle operating power through a 400 cycle pedestal-free switch 108 which is controlled by the programmer 101. The switch 108 and the gate 103 are enabled in a complementary fashion such that when the gate 103 is enabled and the counter 105 is accumulating counts for the drift angle computation, gate 108 is disabled and the magnetic amplifier 107 produces no output. At the end of the computation, gate 103 is disabled to interrupt $f_L$ and switch 108 is enabled to apply power to the magnetic amplifier 107 and permit a correction to be made in the drift angle indication corresponding with the most recently computed value. The remaining inputs to the magnetic amplifier 107 will be described hereinafter.

The programmer 101, gate 103, hysteresis switch 120 and flip-flop 110 previously described operate the counter 105. The counter 105 is shown to comprise nine stages of flip-flop connected ORN circuits each stage of which includes two transistors which are consecutively numbered Q1 to Q18. The counter 105 has a One's current line 121 and a Complement current line 122. The One's line 121 is connected through resistors 123 and Stabister diodes 124 to the collector of the odd numbered transistor in each flip-flop stage of counter 105. The Zero's line 122 (or Complement line) is connected through resistors 125 and Stabister diodes 126 to the collector of the even numbered transistors in each stage of the counter 105. The value of resistors 123 and 125 are inversely weighted to provide, with the precise resistance of the diodes 124 and 126, respectively, a value associated with each particular counter flip-flop stage which permits a current magnitude to flow in the respective One's or Complement lines 121, 122 corresponding with the binary value of the particular flip-flop stage. Thus, resistor 123 and diode 124 associated with transistor Q1 in the first flip-flop stage have a total value of 256 thousand ohms and resistor 125 and diode 126 associated with transistor Q2 of the first flip-flop stage have a total value of 256 thousand ohms. The corresponding value for resistor 123 and diode 124 associated with transistor Q17 in the ninth flip-flop stage is 1,000 ohms and the value for resistor 125 and diode 126 associated with transistor Q18 in the ninth stage is 1,000 ohms. The intermediate values between the first and last flip-flops for the respective resistors 123 and 125 progress between these values inversely in accordance with the binary weight of each stage in order to permit a current flow which corresponds with the binary weight of each stage in the respective One's line 121 and Complement's line 122.

The count output of the ninth flip-flop stage is applied on line 127 to a counter circuit comprising transistors Q19 and Q20 connected to have transistor Q20 normally set for conduction and triggered into a condition with transistor Q19 conducting upon the occurrence of the first count output from the flip-flop comprising transistors Q17 and Q18. The output of transistor Q19 on line 128 is applied to amplifier transistor Q22 and the output of transistor Q20 on line 129 is applied to amplifier transistor Q21. The signal on line 128 also applies a count on line 131 to add a count by switching transistor Q2 at the first overflow count. The output of transistor Q22 passes through an emitter follower Q32 and is applied to the base of a switch transistor Q33. Amplifier Q21 has its output connected to an emitter follower Q34 which drives a switch transistor Q35. Transistors Q21 and Q22 are normally non-conductive during the counting interval due to a blanking gate on line 132 from program flip-flop 101.

An input line 136 supplies gated $f_L/2$ frequency to the input of the counter at the first stage thereof. A ONE set line 137 is connected to line 100 to set the ONE side of all the flip-flop stages of counter 105 upon the occurrence of the start signal $t_x$ for the $f_x$ count to the programmer 101. The One set signal also switches transistor Q20 into conduction thereby switching transistor Q19 out of conduction. Conduction in transistor Q20 causes, but for the blanking gate on line 132, transistor Q21 to be non-conductive while the ONE's set signal on line 137 causes transistor Q22 to be conductive. A predetermined D.C. reference voltage from a Zener voltage reference diode 139 is applied through gating transistor 163, cosine potentiometer 42 and emitter follower 161 to the collectors of the switch transistors Q33 and Q35. The emitter of transistor Q33 is connected to the Complement current line 122 and the emitter of transistor Q35 is connected to the One's current line 121.

The operation of the counter 105 to produce currents having the proper magnitude and sense to correspond to drift angle can be understood by considering two different counts of $f_L/2$ one of which is less than the five hundred and twelve count capacity of the counter 105 and one of which exceeds this count capacity. Initially, when an $f_L/2$ count is to begin a ONE set signal from line 100 on line 137 sets all of the flip-flops in the ONE condition with even number transistors Q2–Q18 and Q20 conducting as previously noted. The first $f_L/2$ count, therefore, flops all of the stages. Succeeding counts of $f_L/2$ are then registered in normal counting action. As long as this count is less than five hundred and twelve, transistor Q19 is conducting and, upon readout transistors Q32 and Q33 are conducting. Readout occurs when line 132 unblanks at the end of the drift angle program for which condition the current in the ONES line 121 will be supplied from the reference voltage source established by the Zener diode 139 through the collector-emitter path of transistor 163, cosine potentiometer 42, emitter follower 161, the collector-emitter path of transistor Q33 through Complement line 122 to a coil 141 in magnetic amplifier 107 returning on ONES line 121 through any of the resistors 123 and diodes 124 which are connected to conducting odd numbered transistors Q1 to Q17, inclusive, which conductive transistors effectively connect the collector electrodes thereof to ground. For this current path the diodes 124 are poled in the conductive direction so as not to oppose current flow. For this same condition the transistors of even numbers Q2 and Q18 which may be conducting, depending on the particular $f_L/2$ count, are not effective to establish a current path through the coil 141 but merely conduct current from the Zener source 139 through the previously traced circuit to the collector-emitter path of transistor Q33 and any resistors 125 and diodes 126 associated with an even number conducting transistor Q2 to Q18, inclusive, to ground. The diodes 124 in circuit with any non-conducting transistors of odd number transistors Q1 to Q17, inclusive, are poled with respect to the minus 12 volt collector supply voltage to be non-conductive thereby preventing any leakage current through a non-conducting transistor from contributing to the magnitude of the drift angle current established by the count in the counter.

At the five hundred and twelfth count of $f_L/2$ transistor Q20 becomes conductive and on readout for any subsequent count transistor Q21 becomes conductive making transistors Q34 and Q35 conductive and transistors Q32 and Q22 are changed to the non-conductive state. For this condition the current path from the Zener source 139 is as previously traced to the collector-emitter path of transistor Q35 and then through the ONES current line 121 to coil 141 returning on the Complement current line 122 to any of the resistors 125 connected through diodes 126 to even numbered transistors Q2 to Q18, inclusive, which may be conducting and through the collector-emitter path of such conducting transistors to ground. As in the previous case the diodes 126 are poled in the direction to be conducting for those even numbered transistors Q2 to Q18 which are conducting but are poled to be non-conductive for non-conductive transistors which apply the minus 12 volt collector source voltage to the diode anode. Also, as in the previous case, the path through the collector-emitter junction of transistor Q35 through any of the resistors 123 associated with conducting odd numbered transistors Q1 to Q17, inclusive, merely goes to ground and does not contribute current through the coil 141. It will be apparent that for these two cases the current flow through coil 141 is in opposite directions and thus has sense relative to whether the counter 105 is counting against its complement or has been filled once and has started to accumulate an $f_L/2$ count in excess of its capacity. In each case the current magnitude will be selected by the count present in the counter at the end of the gating interval for counting $f_L/2$ and its value determined by the effective binary weighting resistors to be proportional to $(f_x/2-f_L)/f_x/2$ which is equal to to $(1-2f_L/f_x)$.

The magnetic amplifier 107 comprises three saturable toroidal cores 140, 142 and 143 which are stacked in aligned position to receive individual and common windings thereon. The winding 141 encircles all of the cores 140, 142 and 143. The amplifier 107 is energized by a coil 144 on core 143 and a coil 145 on core 142 which are serially connected to a minus 12 volt D.C. source and to A.C. gate circuit 108. The A.C. gate circuit 108 comprises two transistors 146 and 147 which are driven in by the gating signal from programmer 101. The emitter of transistor 146 is connected to a 1.2 volt A.C. 400 cycle source. During the computation period no A.C. is applied to the windings 143, 145 of amplifier 107. At the end of the computation period when the new value of drift angle is to be utilized to correct the drift angle indication, transistor 146 becomes conductive thereby applying the 1.2 volt A.C. 400 cycle power through the collector-emitter path of transistor 146 to the windings 144 and 145. This switching action does not switch the D.C. component flowing from the 12 volt source and thus no D.C. step is present.

A current proportional to the tangent of the indicated drift angle is applied to a coil 148 which encircles all three cores 140, 142, and 143. The current for coil 148 is derived from the tangent bridge 109. The bridge 109 comprises a linear one thousand ohm potentiometer 149 and two fixed resistors 151 and 152. The winding 148 is connected between the junction of resistors 151 and 152 and the adjustable contact 153 of potentiometer 149. The tangent bridge 109 is connected through Stabister 199 and resistor 198 across the gated stable voltage source supplied by Zener diode 139 and transistor 163. The Stabister 199 is similar to the diodes 124, 126 in counter 105 and provides with resistor 198 temperature compensation for the temperature effect on the current in coil 141. With the values of resistors 151 and 152 each equal to eight hundred twenty ohms and the value of potentiometer 149 equal to one thousand ohms and with approximately two hundred ohms in the circuit of winding 148 the bridge 109 produces a current which corresponds with the tangent of one-third the angle of rotation of the shaft which moves slider 153. This factor of one-third is provided to amplify the drift angle indication and obtain better resolution on the tangent potentiometer 149.

The amplifier 107 includes a trim winding 154 which is supplied with an adjustable current from a bridge circuit 155. The remaining windings on the amplifier 107 are a pitch-sine roll product winding 156 encircling all of the three cores and an output winding 158 encircling all three cores. The windings 148, 141, 156 and 154 are physically wound as the individual insulated conductors of a tetrafilar wire. This wire is transposed by a uniform twist which rotates the positions of the conductors 360° in each linear foot of wire. The effect of this structure is to provide substantially perfect summing of the currents in the four strands of the tetrafilar wire since each has exactly the same coupling to the magnetic cores.

The output of winding 158 is proportional to the difference between drift angle and the setting of potentiometer 149 in amplitude and has a phase which corresponds with the sense of the error. This output current from winding 158 is applied on line 32 to the input of servo amplifier 33. The servo amplifier 33 drives motor 34 in a direction to null the amplifier 107 by adjusting the position of slider 153 on potentiometer 149. A generator 192 provides rate feedback action by supplying generated signals to an input to amplifier 33. A synchro transmitter 193 is also driven by the motor 34 to transmit drift angle values on lines 194 to the navigation computer and remote indicators.

The drift angle computer as thus far described corresponds generally with that of the referenced Gunkel et al. application. In accordance with the present invention, the current supplied by counter 105 which is representative of drift angle and is utilized in the magnetic amplifier 107 to enter the term $f_{yp}/f_{xp}$ into the drift angle equation is modified in accordance with the cosine of roll as follows.

The switch transistors Q33 and Q35 in counter 105 are supplied from the Zener diode 139 through the emitter follower 161 and the cosine potentiometer 42. This potentiometer 42 the movable contact of which is positioned in accordance with the angle of roll produces a cosine of roll factor to modify the current supplied to the winding 141 so that this current is directly proportional to the product $f_{yp}/f_{xp}$ times cosine roll. A gating line 162 from the program flip-flop 101 gates the transistor 163 to apply the voltage from Zener diode 139 to the collector output circuit 164 only during readout.

The remaining term of the drift angle equation, namely, $V_{zp}/V_{xp}$ times sine roll ($V_{zp}/V_{xp} \cdot \sin r$) is derived from a counter 171 which is identical with the counter 105 and has a polarity switch 172 corresponding to the switch 106. The switch 172 has transistors Q33 and Q35 supplied current from the gated source 164 to which it is connected by line 173. The input to the counter 171 is the frequency $f_F/2$ applied at input line 174. The frequency $f_F$ from the combiner 13 is applied to terminal 175 where it is shaped in a hysteresis switch 176 and divided by two in a flip-flop 177. The application of the frequency $f_F$ from the hystersis switch 176 is effective only during the counting interval determined by the programer 101 due to the action of the $f_F$ gate 178 which is controlled by the program flip-flop. During the counting interval, the frequency $f_F/2$ is applied on line 174 to the input of the counter 171. At the end of the counting interval readout occurs as previously described for the counter 105 to apply a current on line 179 to the sine potentiometer 41. The return circuit for this current from the sine potentiometer 41 is on line 181 and the polarity of current flow will be determined by the condition of the polarity switch 172 which is controlled by the relative magnitude of the ratio $2f_F/f_x$ in a manner exactly similar to that described for switch 106. The current so supplied will be proportional to $(1-2f_F/f_x)$ and is applied to a winding 156 of the magnetic amplifier 107 after being modified by the factor sine roll ($\sin r$) as produced by the potentiometer 41 and the associated circuit. The winding 156 is bridge connected to the tap of potentiometer 41 and the junction of resistors 182. The factor $\sin r$ hence modifies the current flowing in winding 156 in sign as well as in magnitude as determined by the sign and magnitude of the sine function.

The servo for positioning potentiometers 41 and 42 includes the motor 39, control transformer 37 and amplifier 38. The transformer 37 has roll angle input applied electrically at the input terminals 36 and an error feedback signal supplied to the input of the amplifier 38 via line 190.

Referring again to FIG. 4, the corrected value of ground speed as determined by the null position of potentiometer 21 is transmitted by a transmitting synchro 201 to an indicator and navigation computor device 202. Similarly, the corrected value of drift angle is transmitted by the transmitting synchro 193 to the indicator and navigation computor 202 as is the actual track angle obtained from differential synchro 203. The actual track angle is obtained by substracting the heading obtained from a local heading reference, such as a compass, from the drift angle as computed by the Doppler equipment. The indicator portion of the unit 202 indicates ground speed and drift angle by any suitable display of these quantities.

For the navigation computor portion of the unit 202 the ground speed quantity input thereto will be integrated to obtain ground miles and this distance is resolved in accordance with the sine and cosine of the difference angle between selected track and actual track. The actual track angle is obtained from the differential synchro 203 and compared with a selected track angle input at 204 to obtain this difference angle representing intervals during the flight which are not precisely along the selected ground track. The navigation computor thus indicates the distance times the cosine of the angle between actual track and selected track to provide distance component traveled along track and the distance traveled times the sine of this angle to obtain the distance component traveled off-set from the selected track. By reducing the latter indication to zero, the pilot can maintain the aircraft on the selected track and read the distance traveled or the distance to go on the along track indicator. The operation of this navigation computor is generally similar to that of FIG. 13 of the referenced Gunkel application except that the inputs are the corrected values of drift angle and ground speed. With respect to the ground speed input a suitable integration of the ground speed input data will be required since it is now not in terms of frequency, as was the case in the Gunkel et al. apparatus of FIG. 13 hereinabove mentioned.

The Doppler system of the present invention operating as herein disclosed provides improved accuracy in the ground speed and drift angle quantities computed and indicated and results in improved accuracy of the navigation computor for extreme flight profiles which involve large angles of pitch and roll. Various modifications will be apparent from the present teaching for practicing the invention and accordingly the disclosure is to be deemed illustrative only with the invention not being limited to the precise arrangements disclosed. The invention is accordingly to be interpreted as including such modifications as come within the scope of the appended claims.

What is claimed is:

1. A Doppler navigation system comprising antenna means for radiating and receiving energy beams in fixed angular relation to an aircraft, means responsive to Doppler data from said beams for generating frequencies representative of the components of velocity of said aircraft, a voltage tuned ground speed oscillator, means for comparing the frequency of said ground speed oscillator with a predetermined function of said generated frequencies and generating an error signal having magnitude and sense representing the difference between the compared quantities, an adjustable voltage source connected to control the frequency of said ground speed oscillator, means responsive to said error signal for adjusting said voltage source to null said error signal, and means for modifying by a factor proportional to the cosine of the angle of pitch of said aircraft the adjustment of said voltage source required to obtain said null.

2. Apparatus according to claim 1 in which said voltage source is a potentiometer having an adjustable tap to provide said adjustable voltage source, and said means for modifying the adjustment of said voltage source comprises a supply voltage across said potentiometer which varies as said cosine.

3. Apparatus according to claim 2 in which said supply voltage is derived from the movable tap of a shorted linear potentiometer, said potentiometer having a loading resistor connected from the shorted terminals thereof to said movable tap to approximate said cosine function.

4. Apparatus according to claim 3 including means for limiting the adjustment of the tap on said shorted linear potentiometer to remain within limits corresponding to a predetermined range of said pitch angle.

5. A Doppler navigation system comprising antenna means for radiating and receiving energy beams in fixed angular relation to an aircraft, means responsive to Doppler data from said beams for generating frequencies representative of the components of velocity of said aircraft, a voltage tuned ground speed oscillator, means for comparing the frequency of said ground speed oscillator with a predetermined function of said generated frequencies and generating an error signal having magnitude and sense representing the difference between the compared quantities, an adjustable voltage source connected to control the frequency of said ground speed oscillator, means responsive to said error signal for adjusting said voltage source to null said error signal, means for modifying by a factor proportional to the cosine of the angle of pitch of said aircraft the adjustment of said voltage source required to obtain said null, means responsive to the generated frequencies representing velocity components for deriving a first quantity representative of the ratio of the transverse velocity to the longitudinal velocity and a second quantity representative of the ratio of the normal velocity to the longitudinal velocity, means for modifying said first quantity by a factor proportional to the cosine of the angle of roll of said aircraft, means for modifying said second quantity by a factor proportional to the sine of said angle of roll, and means responsive to the difference between said modified first and second quantities for indicating drift angle.

6. Apparatus according to claim 5 and including means for indicating the modified adjustment of said voltage source in terms of ground speed.

7. Apparatus according to claim 6 and including a navigation computer responsive to heading data for said aircraft and to the indicated ground speed and drift angle values for indicating the present position of said aircraft relative to a predetermined ground track.

8. A Doppler navigation system comprising antenna means for radiating and receiving energy beams in fixed angular relation to an aircraft, means responsive to Doppler data from said beams for generating signals representative of the longitudinal transverse and normal components in the aircraft coordinate system of velocity of said aircraft, means for computing a first quantity proportional to the ratio of said transverse to said longitudinal components times the cosine of the angle of roll, means for computing a second quantity proportional to the ratio of said normal to said longitudinal components times the sine of the angle of roll, and means responsive to the difference between said first and second quantities for computing the drift angle of said aircraft.

9. A Doppler navigation system comprising antenna means for radiating and receiving energy beams in fixed angular relation to an aircraft, means responsive to Doppler data from said beams for generating frequencies representative of the components in the aircraft coordinate system of velocity of said aircraft, means for computing a first quantity proportional to the ratio of transverse to longitudinal components of said velocity, means for computing a second quantity proportional to the ratio of normal to longitudinal components of said velocity, means for modifying said first quantity by a factor equal to the cosine of roll angle of said aircraft, means for modifying said second quantity by a factor equal to the sine of said roll angle, means responsive to the difference of said modified quantities for producing an output representation of the drift angle of said aircraft, and means for indicating said drift angle.

10. Apparatus according to claim 9 in which said means responsive to said difference is a magnetic amplifier and said modified quantities are applied to said amplifier as input currents and including additional input and output windings on said amplifier, a servo system coupled to respond to the signal from said output winding, means for generating a current proportional to the tangent of an angle, and means for applying the generated tangent current to said input winding to produce a null signal at said output winding when said angle represents the drift angle of said aircraft.

11. A Doppler navigation system comprising means for radiating and receiving four energy beams directed symmetrically downwardly in the four quadrants defined by the aircraft coordinates, said beams being in fixed positions in the front-left, front-right, back-right and back-left quadrants respectively, means responsive to the Doppler data from said beams for generating frequencies representative of the longitudinal, transverse and normal components of velocity of said aircraft in said aircraft's coordinates, means for adding frequencies representing Doppler data from a diagonal pair of said beams to produce a left-right frequency, means for adding the frequencies representing Doppler data from a pair of said beams disposed on the same side of the transverse axis of said aircraft to produce an up-down frequency, means for counting said left-right frequency for an interval corresponding to a predetermined count of said generated frequency representing said longitudinal velocity component of said aircraft, means responsive to the count of said left-right frequency during said interval for producing a first current having magnitude and sense representing the ratio of said transverse to longitudinal velocity components, means for counting said up-down frequency during a similar interval determined by a predetermined count of said longitudinal velocity frequency, means responsive to the count of said up-down frequency during said similar interval for producing a second current having magnitude and sense representing the ratio of said normal to longitudinal velocity components, means for modifying said first current by the factor of the cosine of roll angle of said aircraft, means for modifying said second current by the factor of the sine of said roll angle and means responsive to the difference between said modified first and second currents for determining the drift angle of said aircraft.

12. Apparatus according to claim 11 in which the last recited means comprises a magnetic amplifier having at least three input windings and one output winding, means for coupling said modified first and second currents of two of said input windings respectively, means for generating a third current proportional to the tangent of an angle input quantity, means for coupling said third current to the remaining one of said input windings, and means responsive to the signal from said output winding for driving said angle input quantity to a position to null said magnetic amplifier.

References Cited by the Examiner

UNITED STATES PATENTS

| | | | |
|---|---|---|---|
| 3,095,562 | 6/1963 | Dworetsky | 343—8 |
| 3,150,365 | 9/1964 | Wimberly | 343—9 |
| 3,153,233 | 10/1964 | Goldmuntz | 343—8 |

CHESTER L. JUSTUS, *Primary Examiner.*